(12) United States Patent
Ito et al.

(10) Patent No.: US 6,208,089 B1
(45) Date of Patent: Mar. 27, 2001

(54) DISCHARGE-LAMP LIGHTING CIRCUIT

(75) Inventors: Masayasu Ito; Jun Yabuzaki; Atsushi Toda, all of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/522,406

(22) Filed: Mar. 9, 2000

(30) Foreign Application Priority Data

Mar. 12, 1999 (JP) .................................................... 11-66746

(51) Int. Cl.[7] .................................................... H05B 37/02
(52) U.S. Cl. .......................... 315/308; 315/219; 315/224
(58) Field of Search .................................... 315/308, 224, 315/209 R, 219, DIG. 7

(56) References Cited

U.S. PATENT DOCUMENTS 5,142,203  8/1992  Oda et al. ............................ 315/308
5,449,973  9/1995  Yamashita et al. ..................... 315/82
5,608,294 * 3/1997  Derra et al. .......................... 315/224

FOREIGN PATENT DOCUMENTS 4-141988  5/1992  (JP) .

* cited by examiner

*Primary Examiner*—David Vu
(74) *Attorney, Agent, or Firm*—Sughrue, Mion, Zinn, Macpeak & Seas, PLLC

(57) ABSTRACT

A discharge-lamp lighting circuit has a switching power source portion (a DC—DC converter) for converting DC voltage and a control circuit for controlling output voltage of the converter by ON/OFF-controlling a switching device constituting the converter. The length of the ON-period of the switching device is changed with respect to a predetermined length of the OFF period to control the ratio of the two periods. In this manner, stable lighting of a discharge lamp and improved lighting efficiency are realized by the light circuit because a change in input/output conditions (change in the power source or a state of a load) of the lighting circuit of the discharge lamp cannot easily exert an influence.

16 Claims, 6 Drawing Sheets

DISCHARGE-LAMP LIGHTING CIRCUIT

FIELD OF THE INVENTION

The present invention relates to a technique for controlling ON/OFF of switching devices constituting a DC—DC converter of a discharge-lamp lighting circuit.

BACKGROUND OF THE INVENTION

A lighting circuit for a discharge lamp, such as a metal halide lamp, is known which incorporates a DC power source, a switching power source circuit, a DC-AC converting circuit and a start circuit. As a control method for a switching power source circuit formed into a DC—DC converter circuit, a PWM (Pulse Width Modulation) method is known. The method is structured such that the frequency (a so-called switching frequency) of a control signal for a switching device in a converter circuit is made to be constant. Moreover, the ON/OFF ratio (duty ratio or duty cycle) is varied so that the output voltage is changed. For example, control is performed such that when the ON period of the switching device is elongated, the OFF period can be shortened.

When the conventional lighting circuit encounters a non-uniform OFF period of the switching device with respect to change in the switching frequency, there arises a problem in that the efficiency of using the power source deteriorates owing to change in the power supply voltage of the lighting circuit. Another problem arises in that the stability of lighting of the discharge lamp cannot easily be maintained with respect to change in the status (lowering of the tube voltage) of the discharge lamp (for example, the discharge lamp is undesirably turned off).

SUMMARY OF THE INVENTION

Accordingly, an object of the present invention is to realize stable lighting of a discharge lamp and improve lighting efficiency by realizing a lighting circuit of the discharge lamp on which an influence of change in the input/output condition (change in the power source or a state of a load) is not easily exerted.

To solve the foregoing problems, according to one aspect of the present invention, there is provided a discharge-lamp lighting circuit comprising: a switching power source portion having a DC—DC converter structure to convert DC voltage; and, a control circuit for controlling output voltage by controlling ON/OFF of switching devices constituting the switching power source portion, wherein the control circuit controls the ratio of an ON period and an OFF period of the switching device by changing the length of the ON period such that the length of the OFF period is made to be constant.

According to the present invention, control of switching of the switching device is performed such that the length of the ON period is changed on the assumption that the length of the OFF period is made to be constant. Therefore, an influence on the lighting characteristic and efficiency of the discharge lamp, caused from change in the OFF period, can be eliminated.

BRIEF DESCRIPTION OF THE DRAWINGS

FIG. 2 schematically shows two examples of the structure of a switching power source portion, in which

PREFERRED EMBODIMENT OF THE INVENTION

Figure 1:
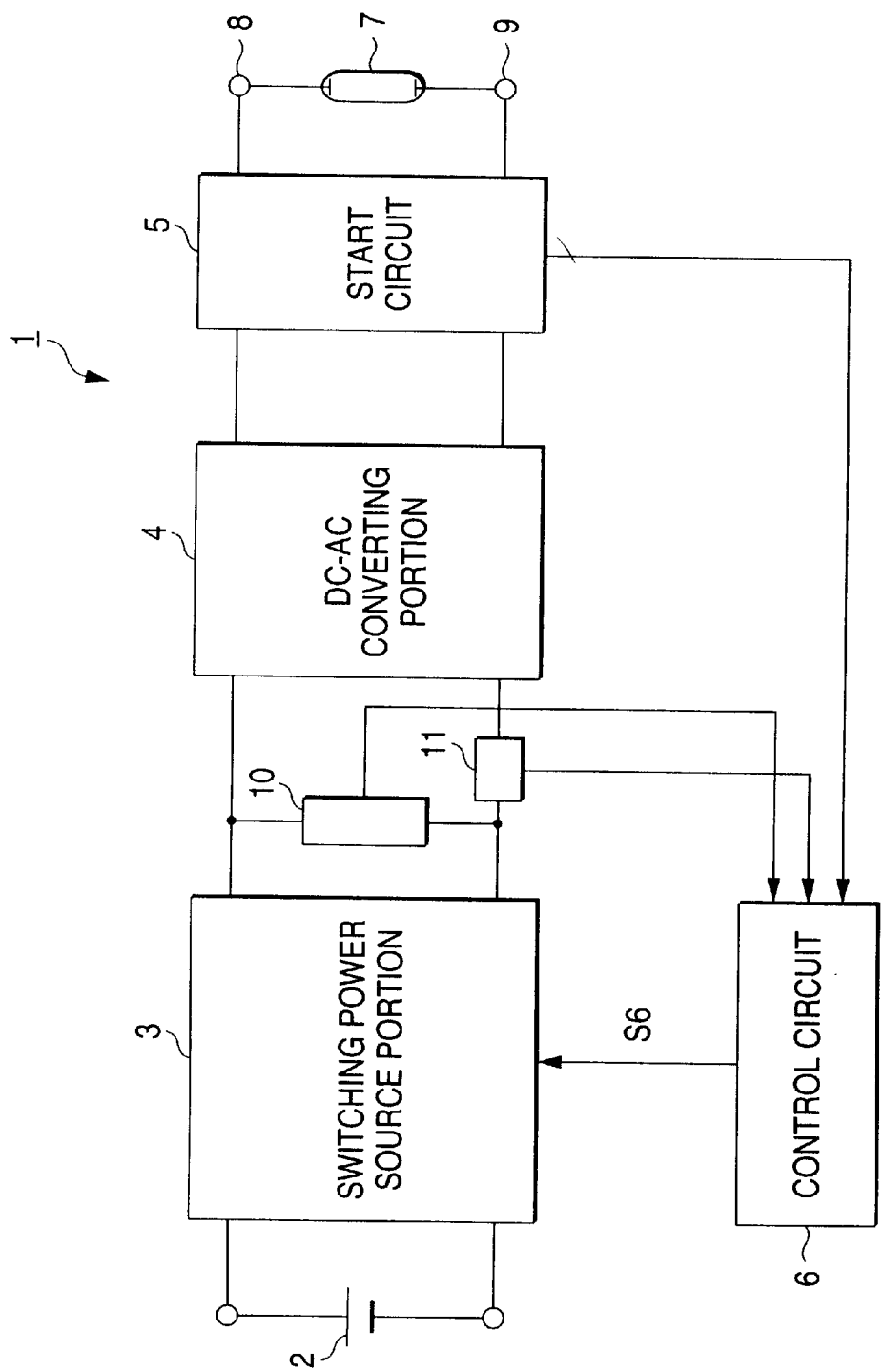
FIG. 1 is a circuit diagram showing the basic structure of the present invention.

FIG. 1 shows the basic structure of the present invention. A discharge-lamp lighting circuit 1 incorporates a DC power source 2, a switching power source portion 3, a DC-AC converting means 4, a starting circuit 5 and a control circuit 6. The discharge-lamp lighting circuit 1 may be applied to a discharge lamp for a vehicle, such as a metal halide lamp. As a matter of course, the discharge-lamp lighting circuit 1 can be widely employed.

Figure 2A:
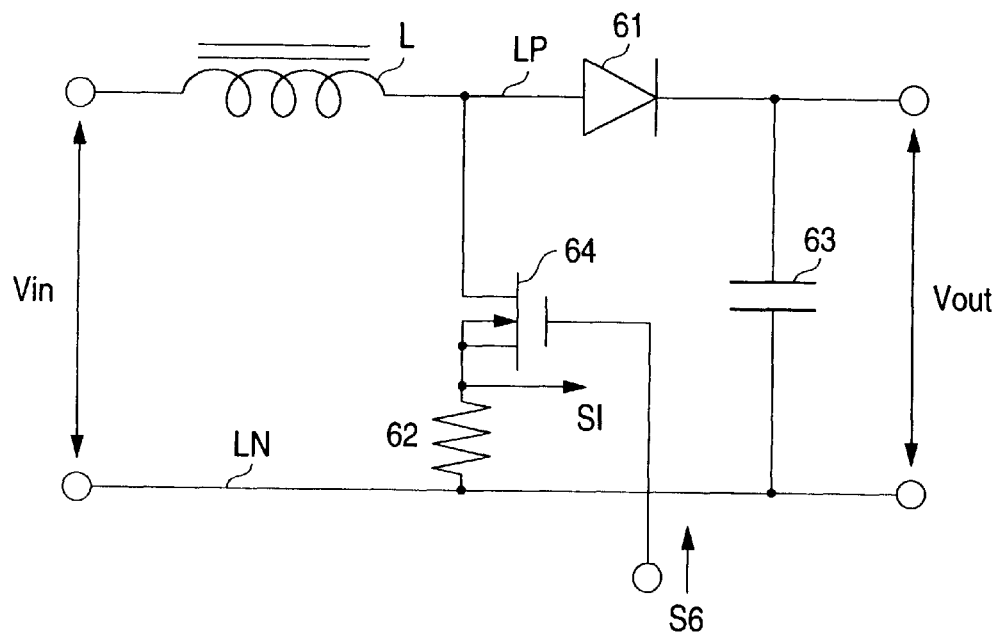
FIG. 2A shows a structure incorporating an inductor and FIG. 2B shows a structure incorporating a transformer.

The switching power source portion 3 has a circuit structure to serve as a DC—DC converter. As schematically shown in FIG. 2A, a structure may be employed in which an inductor L, a switching device 64, a diode 61 and a capacitor 63 are provided with respect to input voltage "Vin" from the DC power source 2. Another structure, schematically shown in FIG. 2B, may be employed in which a transformer T and a switching device 74 are provided to correspond to input voltage "Vin" from the DC power source 2. Moreover, a diode 71 and a capacitor 73 are provided on the secondary side of the transformer T.

That is, the structure shown in FIG. 2A is formed such that the inductor L and the diode 61 are disposed on a positive line LP which connects the input terminal of the DC power source and the output terminal to each other. Moreover, the drain of an N-channel FET which is the switching device 64 is connected in between the inductor L and (the anode of) the diode 61. The source of the FET is, through a resistance 62 for detecting an electric current, connected to a negative line LN (or a ground line). The voltage of the terminal of the capacitor 63 disposed in the output stage is extracted as output voltage "Vout".

Figure 2B:
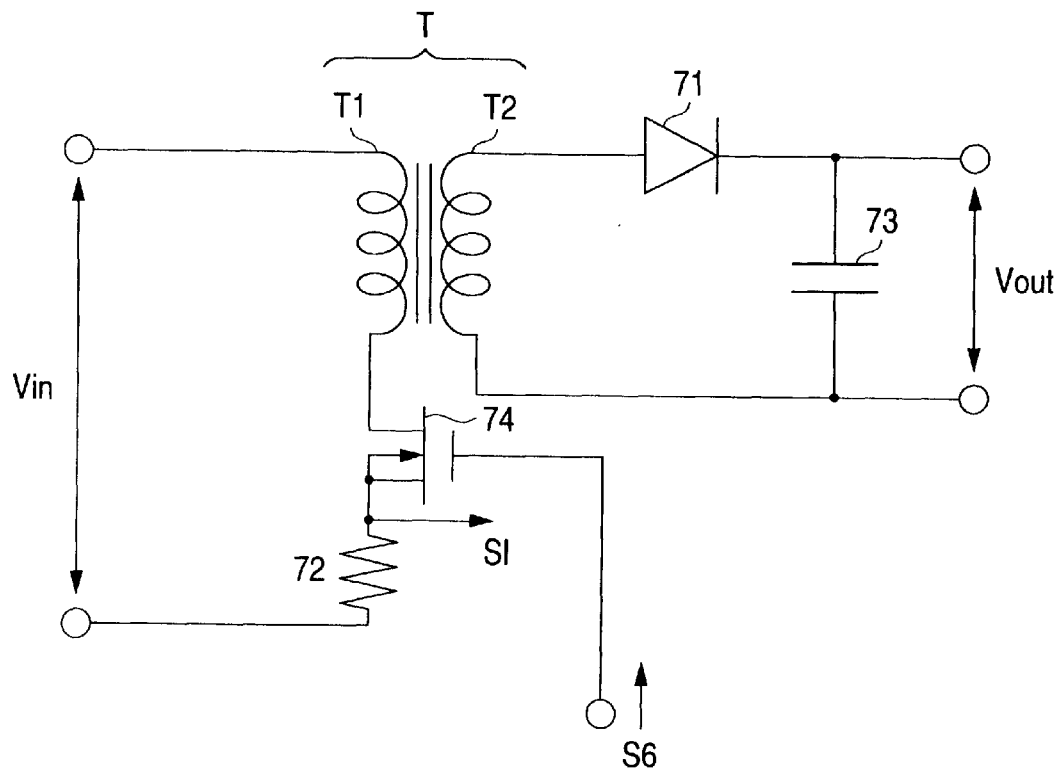

The structure shown in FIG. 2B is formed such that the N-channel FET which is the switching device 74 is provided for a primary coil T1 of the transformer T (the resistor 72 for detecting an electric current is connected to the source). The diode 71 and the capacitor 73 are provided for the secondary portion of the transformer T. Thus, the voltage of the terminal of the capacitor 73 is extracted as output voltage "Vout".

In either case, a control signal (hereinafter called "S6") is supplied from the control circuit 6 so that switching of the switching device 64, 74 is controlled (the control signal is supplied to the gate of the FET so that the ON/OFF state of the FET is determined). Thus, the output voltage level of the switching power source portion 3 is varied.

The DC-AC converting means 4 is disposed at the rear of the switching power source portion 3 to convert the DC voltage to AC voltage. For example, the DC-AC converting means 4 has a full bridge circuit structure composed of a plurality of pairs of switching devices (FET or the like).

The output voltage from the DC-AC converting means 4 is supplied to the discharge lamp 7. When the discharge lamp is turned on, high-voltage starting pulses (or turning-on pulses) must be superimposed on the output of the DC-AC converting means 4 so as to be supplied to the discharge lamp. Therefore, a starting circuit 5 is disposed between the DC-AC converting means 4 and the discharge lamp 7. The discharge lamp 7 is connected to the output terminals 8 and 9 of the starting circuit 5.

The control circuit 6 controls the operation of the switch constituting the direct current (DC)-direct current (DC) converter (the switching power source portion 3) in response to detection signals from an output-voltage detection portion 10 and an output-current detection portion 11 disposed between the switching power source portion 3 and the DC-AC converting means 4. Thus, the control circuit 6 controls the output voltage from the converter. As described later, an improved switching control method is employed. That is, the control circuit 6 controls the ratio of an ON period and an OFF period such that the length of the ON period of the switching device 64, 74 is varied with respect to the predetermined OFF period.

Figure 3:
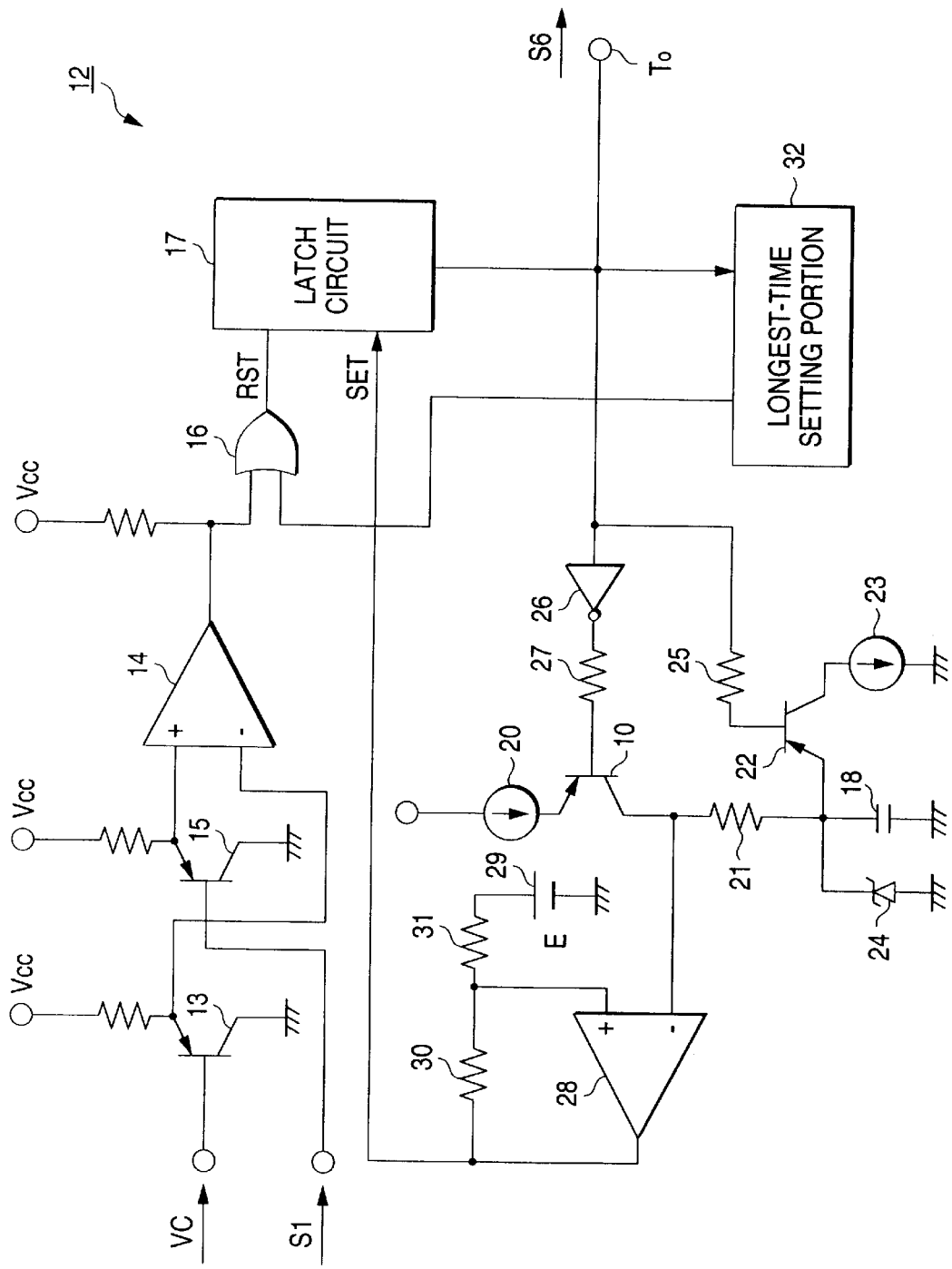
FIG. 3 is a diagram showing an example of the structure of an essential portion of a control circuit.

FIG. 3 shows an example 12 of the structure of an essential portion of the control circuit 6. Control voltage "VC" is supplied to the base of a pnp transistor 13 having a grounded collector. An output from the emitter of the transistor 13 is supplied to a negative input terminal of a comparator 14. The control voltage VC is a signal for controlling the electric power of the discharge lamp 7. The control voltage VC is a signal for controlling lighting and corresponds to the state of the discharge lamp 7. The signal VC is generated in response to a detection signal of the tube voltage or the tube current of the discharge lamp or corresponding signals (for example, a detection signal obtained by the output-voltage detecting portion 10 or the output-current detection portion 11). The signal VC can also be obtained from a known control-signal generating circuit (for example, a circuit, incorporating a calculation amplifier or the like, that generates a signal for supplying excessively large electric power larger than rated electric power in an initial stage of the operation of the discharge lamp and for then shifting the control to constant electric-power control with rated electric power by gradually reducing the supplied electric power in accordance with a control curve of a tube voltage-tube current graph of a discharge lamp (refer to Japanese Patent Laid-Open No. 4-141988)).

In this embodiment, the control voltage VC is limited to be lower than a predetermined voltage (an upper voltage), to limit the value of the electric current which flows in the switching device 64, 74 (the function of the control voltage VC is described below).

A detection signal (hereinafter called "SI") obtained by a current detection means (refer to resistor 62, 72 for detecting an electric current, respectively shown in FIGS. 2A and 2B), for detecting an electric current which flows in the switching device 64, 74, is supplied to the base of a pnp transistor 15 having a grounded collector. An output from the emitter of the transistor 15 is supplied to a positive input terminal of the comparator 14.

The emitter of each of the transistors 13 and 15 is connected to a power source terminal VCC through a corresponding resistor. An output terminal of the comparator 14 is connected to the power source terminal VCC through a pull-up resistor.

An output signal from the comparator 14 is supplied to one of input terminals of the 2-input OR (logical sum) gate 16. Another input terminal of the OR gate 16 is supplied with a signal from a longest-time setting portion 32 described later. An output signal from the OR gate 16 is transmitted as a reset (RST) signal for a latch circuit 17 (comprising an RS flip flop or the like).

A circuit portion for determining the OFF period of the switching device 64, 74 incorporates a circuit 18 and a portion for charging/discharging the capacitor 18. That is, a current supply source 20 is disposed on the emitter portion of a pnp transistor 19. The collector of the transistor 19 is, through a resistor 21, connected to the capacitor 18. Thus, the capacitor 18 is charged from the current supply source 20 through the transistor 19.

The emitter of the pnp transistor 22 is connected in between the capacitor 18 and a resistor 21. The collector of the pnp transistor 22 is grounded through a current source 23. Thus, the capacitor 18 is discharged through a route which reaches the current source 23 through the transistor 22. A zener diode 24 disposed in parallel with the capacitor 18 is provided for the purpose of determining the highest voltage of the capacitor 18 by using the zener voltage VZ.

An output signal from the latch circuit 17 is supplied to the base of each of the transistors 19 and 22. The output signal serves as a control signal for the transistor 22 through a resistor 25. Moreover, the output signal serves as a control signal for the transistor 19 through a NOT (logical NOT) gate 26 and a resistor 27.

A comparator 28 is disposed at the rear of the capacitor 18 and the pnp transistor 19. The negative input terminal of the comparator 28 is connected to the collector of the pnp transistor 19. The positive input terminal is supplied with voltage from a constant-voltage source 29 having a reference voltage of "E". An output signal from the comparator 28 serves as a set (SET) signal for the latch circuit 17. A resistor 30 (having a resistance value called "R30") is a resistor interposed between the output terminal of the comparator 28 and the positive input terminal. A resistor 31 (having a resistance value called "R31") is a resistor interposed between the positive input terminal of the comparator 28 and the constant-voltage source 29.

An output signal from the latch circuit 17 is, as a control signal (or an operating signal) S6 for the switching device 64, 74, is output through a terminal To. Also, the output signal is supplied to a longest-time setting portion 32.

Figure 4:
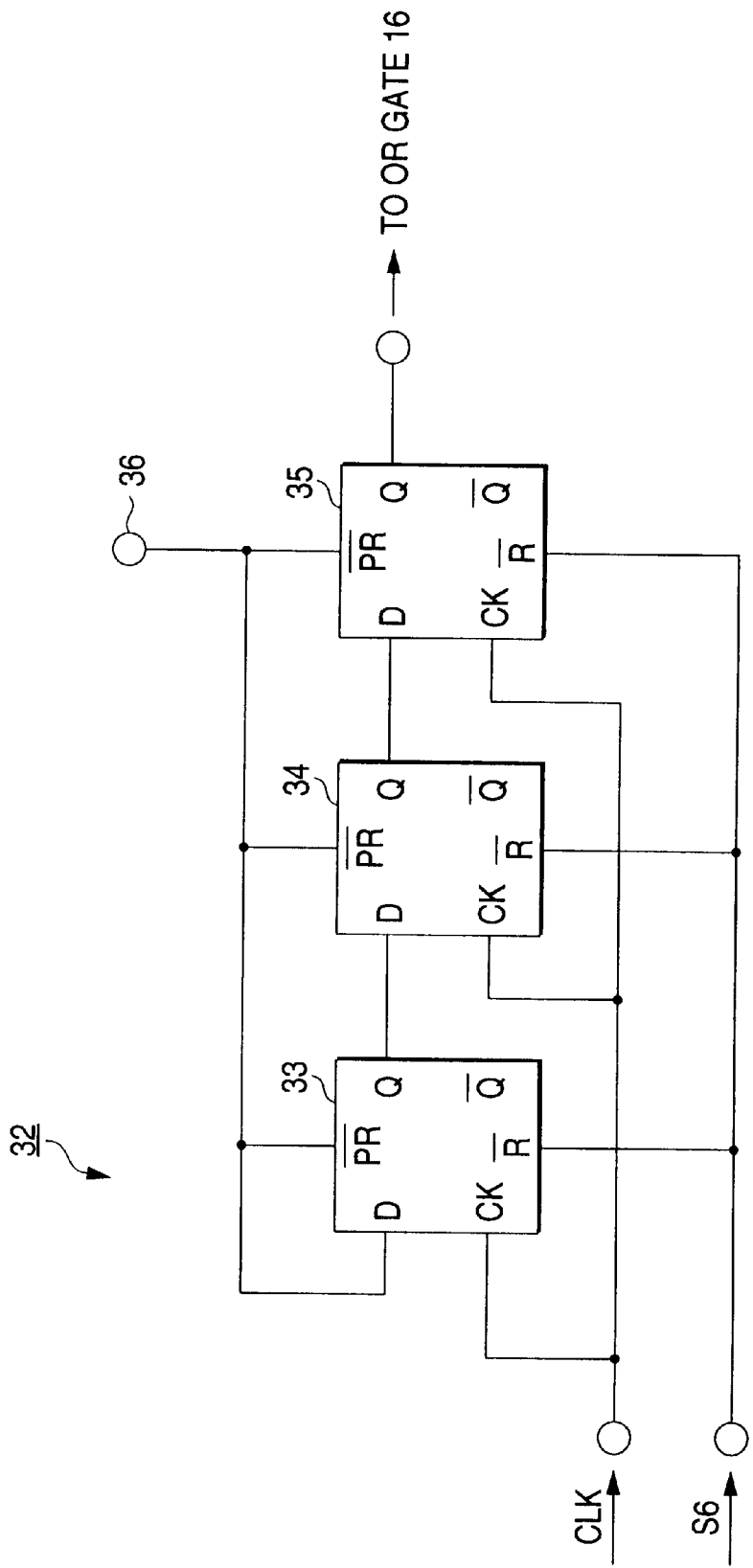
FIG. 4 is a diagram showing an example of the structure of a longest-time setting portion.

The longest-time setting portion 32 is a circuit serving as a means for determining a longest value of the (length of the) ON period of the switching device 64, 74. An example of the structure of the circuit of the longest-time setting portion 32 is shown in FIG. 4.

In this embodiment, three D flip flops 33, 34 and 35 are provided. A clock signal "CLK" from a clock signal generating circuit (not shown) is supplied to an input terminal (CK) of each of the D flip flops 33, 34 and 35.

A control signal S6 (an output signal from the latch circuit 17) is supplied to a reset terminal "R NOT" of each of the D flip flops 33, 34 and 35. The input terminal of the first D flip flop 33 and the preset terminal "PR NOT" of each of the flip flops 33, 34 and 35 are connected to a power supply terminal 36.

The output Q from the first D flip flop 33 serves as the input D for the next D flip flop 34. The output Q from the D flip flop 34 serves as the input D for the final flip flop 35. The output Q from the flip flop 35 serves as the output of the longest-time setting portion 32 (that is, serves as an input signal to the 2-input OR gate 16 shown in FIG. 3).

Figure 5:
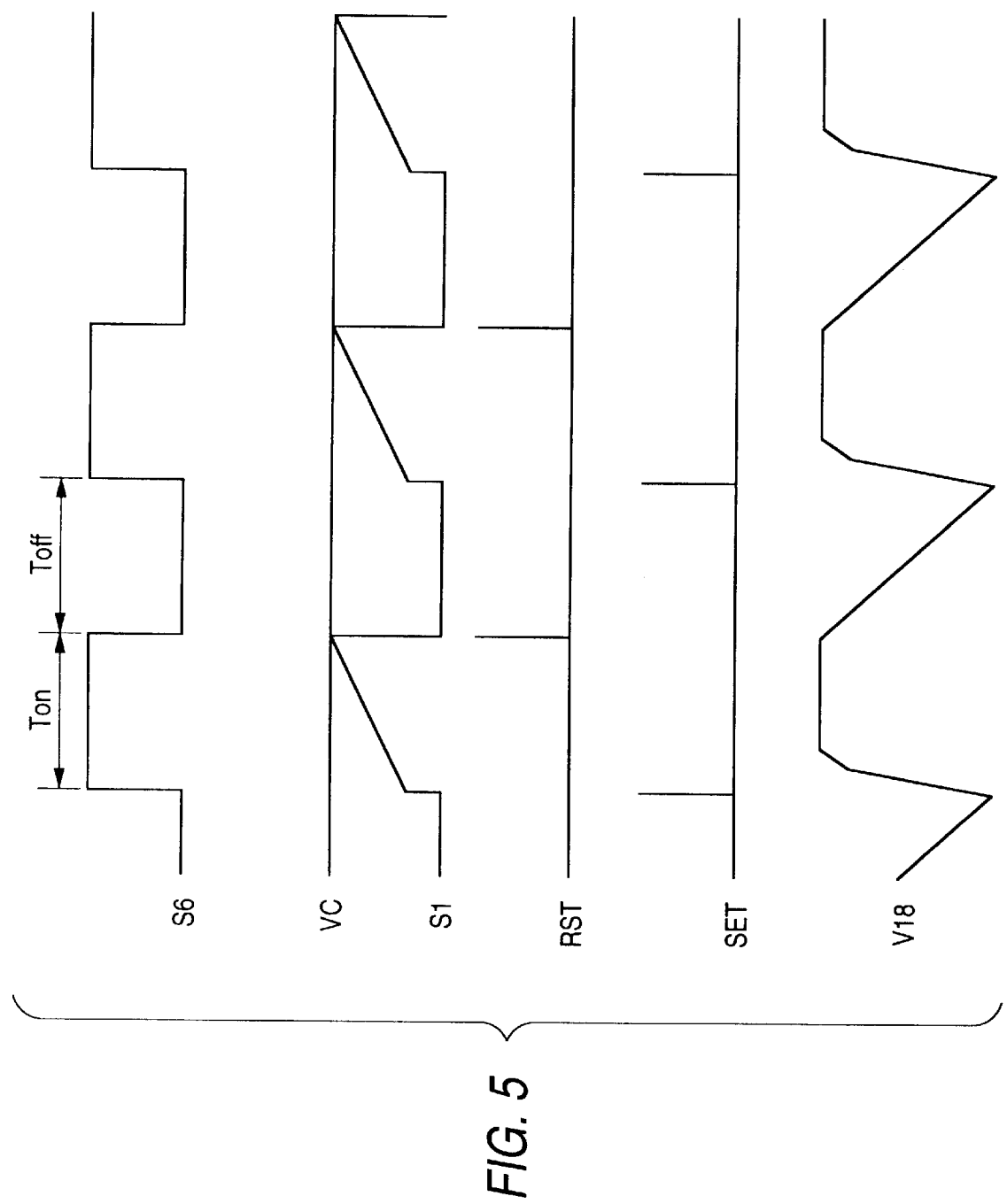
FIG. 5 is a graph schematically showing the operation of the circuit.

FIG. 5 schematically shows waveforms of the signals in the circuit shown in FIG. 3. Symbol "SI" represents a detection signal (detected as a drain current when the switching device 64, 74 is an FET) obtained by the resistor 62, 72 for detecting an electric current, "RST" represents a reset signal for the latch circuit 17, "SET" represents as set signal for the latch circuit 17 and "V18" represents terminal voltage of the capacitor 18. Symbols "S6" and "VC" represent the signals described above for the example of FIG. 3. Note that symbol "Ton" represents the On period (a H (High) level period of the signal S6) of the switching device and "Toff" represents the OFF period (an L (Low) level period of the signal S6).

Referring to FIG. 3, the highest voltage of the capacitor 18 is determined as a zener voltage VZ by the zener diode 24. The lowest voltage "E'" of the capacitor 18 is "E'=E·R30/(R30+R31)".

The OFF period Toff of the switching device 64, 74 is, as shown in FIG. 5, a period in which the terminal voltage V18 of the capacitor 18 falls, that is, a period from last transition start time to a next first transition time (The ON period Ton of the switching device 64, 74 is a period from first transition start time of the capacitor 18 to the last transition start time).

In a period in which the capacitor 18 is discharged through the pnp transistor 22, the output signal from the comparator 28 is L level. The L level output signal is transmitted to the set terminal of the latch circuit 17.

When the terminal voltage of the capacitor 18 has been lowered to the level of the voltage E', the output signal from the comparator 28 is made to be H level. A first transition signal at this time is transmitted to the set terminal (positive-edge trigger input) of the latch circuit 17. Therefore, the level of the control signal S6 for the switching device 64, 74 is made to be H level.

Thus, the pnp transistor 22 for performing discharge is turned off and the pnp transistor 19 for performing charge is turned on.

The voltage of the negative input terminal of the comparator 28 is made to be higher than the voltage E immediately after the pnp transistor 19 for discharge has been turned on. As a result, the output level of the comparator 28 is made to be L level.

The capacitor 18 is charged to the zener voltage VZ and, therefore, the terminal voltage is saturated. The control signal S6 for the switching device is made to be H level until the reset signal is transmitted to the latch circuit 17 in a period in which the output signal from the comparator 14 or the output signal from the longest-time setting portion 32 is made to be H level. That is, when the level of the detection signal SI is lower than the control voltage VC, the output of the comparator 14 is L level. When the level of the signal has reached the control voltage VC, the output of the comparator 14 is made to be H level. Thus, the reset signal is transmitted to the latch circuit 17 through the 2-input OR gate 16. The output is made to be L level. As described above, the control voltage VC serves as a comparison reference voltage with respect to the level of the detection signal SI.

A consideration is made about a state in which the level of the detection signal SI is lower than the control voltage VC (for example, in a case where the current value (the drain current value or the like in a case of the FET) is smaller than an estimated value in spite of raising of the control voltage VC to enlarge electric power supplied to the discharge lamp when the voltage of the DC power source 2 has been lowered). If the reset signal is not supplied to the latch circuit 17, the H level of the control signal S6 for the switching device 64, 74 is maintained.

In a period in which the level of the control signal S6 is H level, the longest-time setting portion 32 counts the clock signal CLK. Thus, the ON period Ton of the switching device 64, 74 is measured. If the duration is longer than a predetermined time (for example, 2 milliseconds to 3 milliseconds with respect to a 1 kHz clock signal), the output Q of the D flip flop 35 is made to be H level and the reset signal is transmitted to the latch circuit 17 through the 2-input OR gate 16 at the FIG. 5 timing. Then, the control signal S6 is made to be L level. The D flip flops 33 to 35 are reset in response to the L level signal (because each reset (R) terminal is the negative-edge trigger input).

As described above, a time measuring means for measuring the duration of the ON period of the switching device is provided to prevent the fact that the length of the duration is not longer than the longest value in the ON period. Thus, a problem (rupture of a device) caused from continuation of the ON-state of the switching device can be prevented. Hence it follows that the circuit can be protected.

As described above, the OFF period Toff of the switching device 64, 74 is made to be constant because it is determined by the discharge period of the capacitor 18. On the other hand, the ON period varies in a range of a permitted longest time. Therefore, the ratio between the ON period and the OFF period varies according to the situation.

When a flyback converter is employed as the DC—DC converter, the relationship between the input voltage and the output voltage is expressed by "Vout=(Ns/Np)·(Ton/Toff)·Vin (note that "Ns/Np" is the ratio of number of windings of the converter transformer, "Ns" is the number of windings of a secondary coil and "Np" is the number of windings of a primary coil). Therefore, when the input voltage Vin has been dropped, control is performed such that the ON period Ton is elongated to maintain Vout (because Toff is constant). That is, the control is changed such that the switching frequency is lowered as the input voltage Vin is lowered to improve the efficiency of the circuit.

When the tube voltage of the discharge lamp is low (when the level of Vout is low), the ON period is shortened because Toff is constant. That is, when great electric power must be supplied to the discharge lamp because the tube voltage of the discharge lamp is low, the control is changed such that the switching frequency is raised to reduce the ripple of the output voltage from the converter.

The operation of the circuit which is performed when the discharge lamp is shifted from a lighting state to a lit off state is as follows.

To cause the discharge lamp in the foregoing state to be returned to a stable lighting state, higher voltage must instantaneously be supplied to the discharge lamp. However, conventional PSWM control method cannot supply electric power larger than the upper limit of the duty cycle.

On the other hand, the foregoing control method according to the present invention is able to supply electric power to the discharge lamp 7 even with a control having the duty cycle lower than the upper limit of the value of the electric which flows in the switching device. Therefore, the performance of the DC—DC converter to raise the voltage can be improved to return the discharge lamp to the stable lighting state. Therefore, the frequency of occurrence of lighting off of the discharge lamp can considerably be lowered.

Note that a countermeasure against noise which is produced from the converter owing to the ON/OFF control of the switching device must be taken. For example, a problem of beating caused from interference of harmonics of the switching frequency with the electromagnetic wave in the radio frequency and must be prevented.

Figure 6:
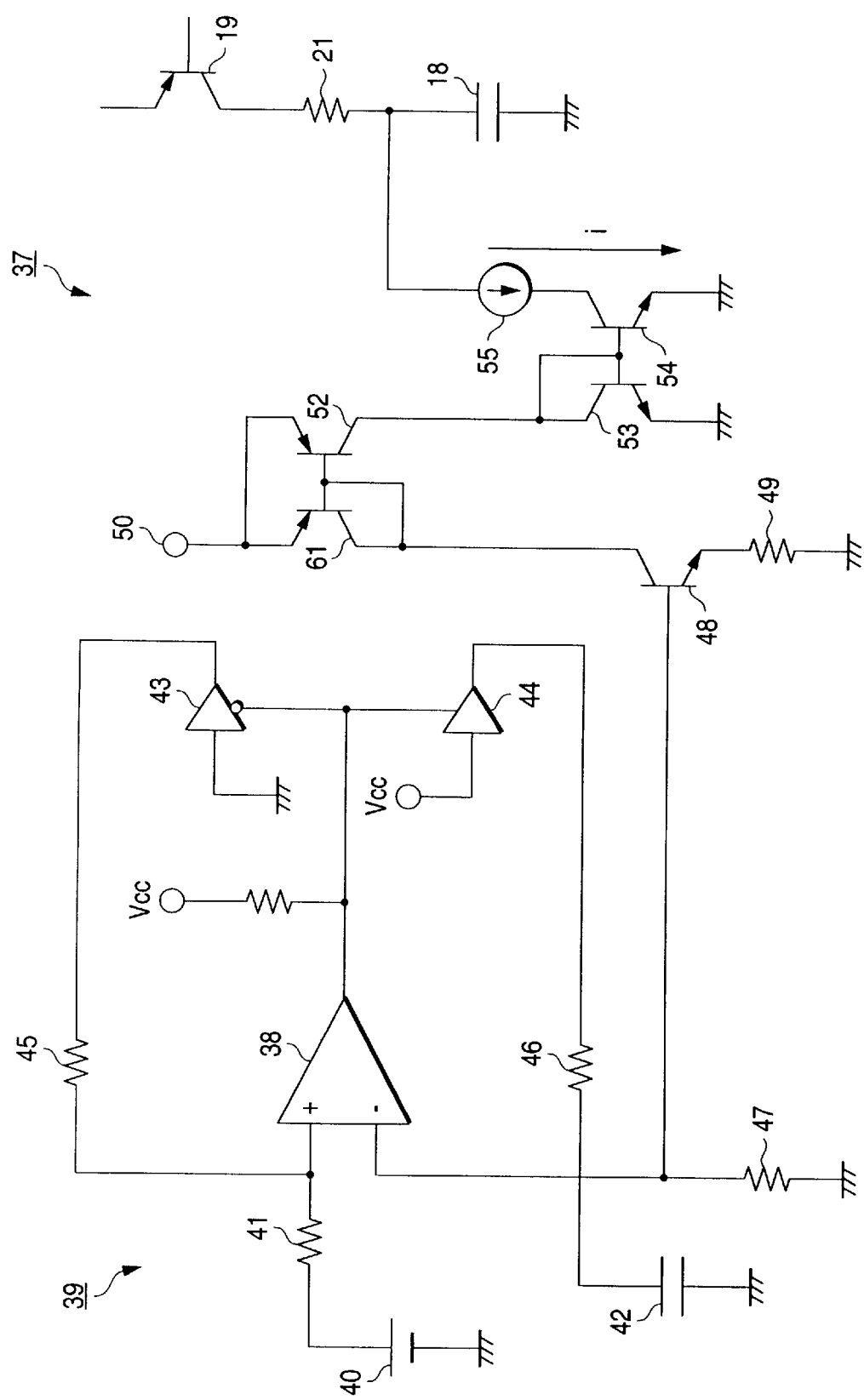
FIG. 6 is a diagram showing an example of the structure of a circuit for preventing a problem of occurrence of a beat frequency.

FIG. 6 shows a circuit example 37. A modulating means for the capacitor 18 is added to modulate the OFF period Toff of the switching device 64, 74 to change the switching frequency in a permissible range.

A comparator 38 and its peripheral circuits constitute a modulating portion 39. A reference voltage is supplied from a constant-voltage source 40 to the positive input terminal of the comparator 38 through a resistor 41. A terminal voltage of a capacitor 42 is supplied to the negative input terminal of the comparator 38. A pull-up resistor is connected to the output terminal of the comparator 38. The output signal from the comparator 38 serves as an enable signal to logic circuits 43 and 44. That is, an enable terminal for the logic circuit 43 is a low-active input. Therefore, when the enable signal is L level, the L level signal which is the input signal is as it is output to be returned to the positive input terminal of the comparator 38 through a resistor 45. When the enable signal is H level, the output stage of the logic circuit 43 is HighZ (high impedance). As for the logic circuit 44, when the enable signal is H level, the H level which is the input signal is as it is output to be returned to the negative input terminal of the comparator 38 through a resistor 46. When the enable signal is L level, the output stage of the logic circuit 44 is made to be high impedance. The logic circuits may be an analog switch incorporating a 3-state buffer, a transfer gate and an FET.

An end of a resistor 47 is connected between the capacitor 42 and a resistor 46 and also connected to the base of an npn transistor 48 having a grounded emitter. The other end of the resistor 47 is grounded.

The emitter of the transistor 48 is grounded through a resistor 49. A current mirror composed of pnp transistor 51 and 52 is disposed between the collector of transistor 48 and a power supply terminal 50. That is, the current mirror performs so-called return of the collector current of the transistor 48. Then, the collector current is allowed to pass through a current mirror composed of the npn transistors 53 and 54. Then, the collector of the transistor 54 is connected to the capacitor 18 (see FIG. 3) through a current source 55. An electric current "i", which flows from the capacitor 18 to the transistor 54 through the current source 55, indicates a discharge current.

In the circuit 37, charge and discharge of the capacitor 42 are repeated in response to the output signal from the comparator 38. Moreover, a signal, having an amplitude determined by the partial pressure realized by the reference voltage of the constant-voltage source 40 and the resistance values of the resistors 41 and 45 and a frequency (a frequency having a width determined by the time constants at the time of charge and discharge of the capacitor 42) determined by the electrostatic capacity of the capacitor 42, determines an electric current i through circuits following the npn transistor 48. The current i fluctuates to correspond to change in the current that is determined by the amplitude of the frequency of the signal supplied to the base of the transistor 48 and the resistance value of the resistor 49. Thus, the (length) of the OFF period Toff of the switching device 64, 74 is changed (the period Toff is determined by the discharge period of the capacitor 18 as described above) so that the switching frequency is modulated.

As described above, the switching frequency is not modulated. That is, the length of the OFF period Toff is changed by the modulating portion 39 (the modulating means). Thus, the width of change in the OFF period Toff can be controlled to satisfy the predetermined range. That is, when modulation is performed such that the ON period Ton and the OFF period Toff are included, it is possible that the length of the OFF period Toff could be shortened excessively. The present invention is able to prevent this problem.

The OFF period of the switching device is modulated with a frequency not lower than 10 Hz nor higher than 1 kHz for a width of time with which the ratio of the longest time of the OFF period and the shortest time of the same is not higher than one nor larger than two (for example, a range not lower than 1.1 nor higher than 2). When the frequency is lower than 10 Hz or when the frequency is higher than 1 kHz or when the ratio of the longest time and the shortest time of the OFF period is smaller than one, a satisfactory effect of preventing the problem caused from beating cannot be obtained.

When the ratio of the longest time and the shortest time of the OFF period is higher than two, a great influence is exerted on the switching frequency. Therefore, there arises a problem in that the size of the DC—DC converter (the switching power source portion) cannot be reduced. Another problem arises a loss (a switching loss) is enlarged.

As described above, the invention has the structure where switching of the switching device is controlled by changing the length of the ON period with respect to a predetermined length of the OFF period. Therefore, an influence caused from change in the OFF period on the lighting characteristic and the efficiency of the discharge lamp can be eliminated. Hence it follows that lighting can be controlled such that an influence caused from change in the input/output conditions including change in the power source and the state of the load cannot easily be exerted.

The invention also is structured such that control is performed in such a manner that the length of the ON period of the switching device is shorter than the longest period determined by the longest-time setting portion. Therefore, a problem (heating of the circuit and rupture of the switching device) caused from continuation of a state that the switching device is switched on can be prevented.

Another aspect of the invention provides the modulating means for modulating the OFF period of the switching device so that generation of beat noise is prevented.

What is claimed is:

1. A discharge-lamp lighting circuit that produces an output voltage, comprising:
 a switching power source portion having a DC—DC converter structure for converting DC voltage, said switching power source portion comprising switching devices; and,
 a control circuit for controlling the output voltage by controlling ON/OFF of said switching devices, wherein said control circuit controls the ratio of an ON period and an OFF period of said switching device by changing the length of the ON period with respect to a constant length of the OFF period.

2. A discharge-lamp lighting circuit according to claim 1, wherein the length of the ON period of said switching device is controlled such that the length of the ON period is not longer than a predetermined value.

3. A discharge-lamp lighting circuit according to claim 1, further comprising: means for modulating the OFF period of said switching device.

4. A discharge-lamp lighting circuit according to claim 2, further comprising: means for modulating the OFF period of said switching device.

5. A discharge-lamp lighting circuit as claimed in claim 1, wherein said switching power source portion comprises an inductor for receiving an input voltage to be switched by said switching devices.

6. A discharge-lamp lighting circuit as claimed in claim 1, wherein said switching power source portion comprises a transformer for receiving an input voltage to be switched by said switching devices.

7. A discharge-lamp lighting circuit as claimed in claim 2, wherein said control circuit comprises a longest time setting portion that generates said predetermined value.

8. A discharge-lamp lighting circuit as claimed in claim 2, wherein a length of said ON period is changed in response to a current flowing in said switching device.

9. A discharge-lamp lighting circuit as claimed in claim 8, wherein said length of said ON period is changed in response to a comparison result of a current flowing in said switching device and a reference value.

10. A discharge-lamp lighting circuit as claimed in claim 9, wherein said reference value is a signal for controlling lighting in response to a tube voltage or a tube current of said discharge or corresponding signals.

11. A discharge-lamp lighting circuit as claimed in claim 8, wherein the length of said ON period is elongated to maintain the output voltage of said switching power source portion while the switching frequency is lowered, when the input voltage of said switching power source portion is dropped.

12. A discharge-lamp lighting circuit as claimed in claim 8, wherein the length of said ON period is shortened while the switching frequency is raised, when a tube voltage of said discharge lamp is low.

13. A discharge-lamp lighting circuit as claimed in claim 8, wherein the length of said ON period is shortened while the switching frequency is raised, when a great electric power is needed to supply to said discharge lamp.

14. A discharge-lamp lighting circuit as claimed in claim 9, wherein said control circuit comprises a longest time setting portion that generates said predetermined value, and when a current flowing in the switching device is less than the reference value, the length of said ON period is defined by said longest time setting portion.

15. A discharge-lamp lighting circuit as claimed in claim 3, wherein a modulating frequency of said ON period is a frequency not lower than 10 Hz nor higher than 1 kHz and a ratio of the longest time of the OFF period and the shortest time of the same is not higher than 1 nor larger than 2.

16. A discharge-lamp lighting circuit as claimed in claim 3, wherein a modulating frequency of said ON period is a frequency not lower than 10 Hz nor higher than 1 kHz and a ratio of the longest time of the OFF period and the shortest time of the same is not higher than 1 nor larger than 2.

* * * * *